United States Patent [19]

Ikeuchi

[11] Patent Number: 5,038,140
[45] Date of Patent: Aug. 6, 1991

[54] SUPERVISORY SYSTEM IN COMMUNICATION SYSTEM

[75] Inventor: Satoshi Ikeuchi, Kawasaki, Japan

[73] Assignee: Fujitsu Limited, Kawasaki, Japan

[21] Appl. No.: 610,302

[22] Filed: Nov. 8, 1990

Related U.S. Application Data

[63] Continuation of Ser. No. 394,309, Aug. 14, 1989, abandoned, which is a continuation of Ser. No. 905,123, Sep. 9, 1986, abandoned.

[30] Foreign Application Priority Data

Sep. 9, 1985 [JP]  Japan ................................ 60-197551

[51] Int. Cl.$^5$ ............................................ H04Q 11/00
[52] U.S. Cl. ........................ 340/825.02; 340/825.08; 340/825.52; 379/338
[58] Field of Search ........................ 340/825.08, 825.52, 340/825.02, 310 R; 455/601, 8, 14, 17, 13; 375/3; 379/221, 279, 338, 343; 370/16

[56] References Cited

U.S. PATENT DOCUMENTS

| | | | |
|---|---|---|---|
| 3,591,724 | 7/1971 | Yaku et al. | 379/221 |
| 3,882,456 | 5/1975 | Takada | 455/8 X |
| 4,032,899 | 6/1977 | Jenny et al. | 364/200 |
| 4,100,533 | 7/1978 | Napolitano | 370/96 X |
| 4,250,489 | 2/1981 | Dudash et al. | 340/825.02 |
| 4,399,531 | 8/1983 | Grande et al. | 370/60 |
| 4,427,968 | 1/1984 | York | 340/310 R |
| 4,638,298 | 1/1987 | Spiro | 340/827 |
| 4,663,706 | 5/1987 | Allen et al. | 364/200 |
| 4,667,287 | 5/1987 | Allen et al. | 364/200 |
| 4,672,373 | 6/1987 | Mori et al. | 340/825.02 |
| 4,696,060 | 9/1987 | Oswald | 455/601 |

FOREIGN PATENT DOCUMENTS

| | | | |
|---|---|---|---|
| 0128934 | 10/1980 | Japan | 379/399 |
| 0015550 | 1/1982 | Japan | 370/96 |
| 0066147 | 4/1983 | Japan | 364/132 |
| 0171843 | 9/1985 | Japan | 370/96 |
| 0084926 | 4/1986 | Japan | 455/8 |

OTHER PUBLICATIONS

"The System X Digital Switching Subsystem (DSS)," A. S. Philip Systems Technology, Sep. 1979, No. 32, pp. 5-19.

Primary Examiner—James L. Dwyer
Attorney, Agent, or Firm—Staas & Halsey

[57] ABSTRACT

In a communication system wherein repeater stations and terminal stations are connected in tandem, a supervisory system in which a logical hierarchical configuration is used for the transmission of supervisory information regarding the stations and a redundant polling is used to easily and securely collect the supervisory information from the slave or repeater stations or the like. Whereby, if faults occur in some of the stations, the collection of the information is carried out without interruption and without the need to install a special information collecting line.

16 Claims, 12 Drawing Sheets

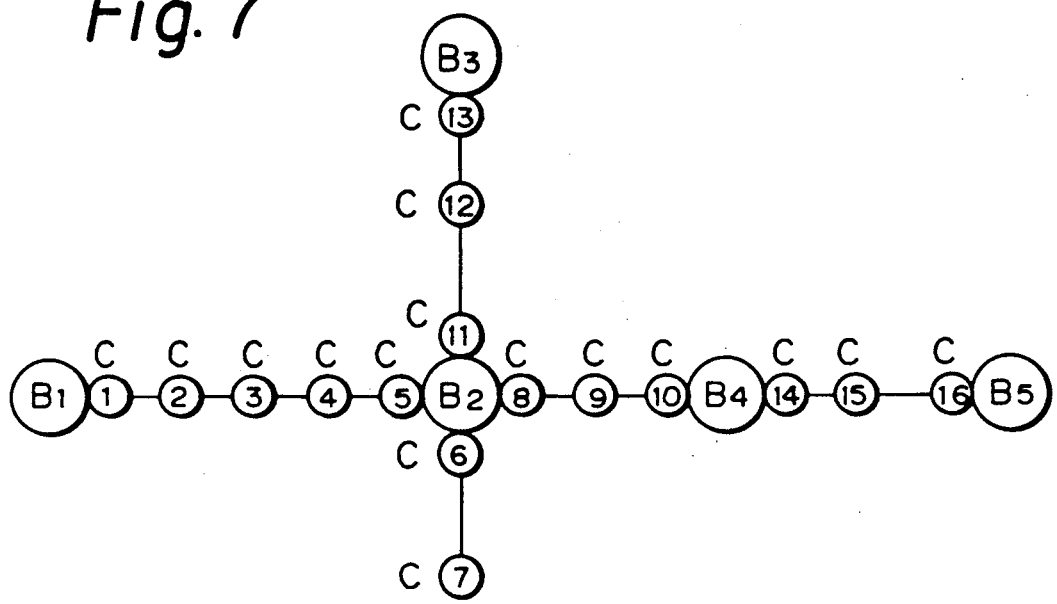

Fig. 10

INNER-LINK BASIC FRAME

| STX | ADR | MLC/MLR | MLCD/MLRD | ETX | BCC |

- STX — START OF TEXT
- ADR — INNER-LINK RECEIVING S-SV EQUIPMENT NUMBER
- MLC/MLR — EXECUTION COMMAND RECEIVING S-SV / EXECUTION RESPONSE RECEIVING S-SV
- ETX — END OF TEXT
- BCC — BLOCK CHECK CHARACTER

MLCD BASIC FRAME

| RMA | SMA | LCN | MDAT 1 |

- RMA — RECEIVING M-SV EQUIPMENT NUMBER
- SMA — SENDING M-SV EQUIPMENT NUMBER
- LCN — LINK COUNTER
- MDAT 1 — ML MODE TRANSFERENCE DATA

```
 6 5 4 3   2 1 0
| 1 0 0 | 01H ~ 0FH |
```

MLRD BASIC FRAME

| RMA | SMA | LCN | I | MDAT 1 |

- LCN — LINK COUNTER
- I — PROTOCOL REQUEST INFORMATION

SUPERVISORY SYSTEM IN COMMUNICATION SYSTEM

This is a continuation of co-pending application Ser. No. 07/394,309 filed on Aug. 14, 1989 which is a continuation of application Ser. No. 06/905,123 filed on Sept. 9, 1986 both now abandoned.

BACKGROUND OF THE INVENTION (1) Field of the Invention

The present invention relates to a supervisory system in a communication system wherein a plurality of unattended repeater stations and attended terminal stations, each of which is ranked as a central master station, a master station, and a slave station, are connected in a tandem arrangement. The stations are connected with a logical hierarchical configuration for processing supervisory information, and the supervisory information of the slave stations is easily collected.

(2) Description of the Related Art

In a communication system such as a telephone exchange network, a data transmission system is known wherein terminal stations located in urban areas are interconnected through a plurality of unattended repeater stations by, for example, optical cables or the like, so as to form a tandem link, and audio data is transmitted at a speed as high as 400 Mb/s. In such a system, the distance between the repeater stations is several tens of kilometers, supervisory information or the like at each repeater station is collected at the terminal stations or supervisory information or the like at each of the repeater stations and the terminal stations is collected at a central station, the information collected at the terminal stations or the central station is analyzed, a faulty portion thereof is distinguished, maintenance is carried out and the system is restored.

In the above-mentioned data transmission system, lines for collecting information are installed between each repeater station and a terminal station or between each repeater station and a central station, and remote supervision is performed by collecting supervisory information at the repeater stations or the terminal stations at the terminal station or the central station, respectively. However, since special lines for collecting the information, other than the data transmission lines, must be laid, the disadvantage of higher line costs is incurred.

Another disadvantage is when the supervisory information or the like is collected at the central station through the line for collecting the information and through the terminal station, if a fault occurs at the terminal station, the supervisory information from the repeater station collected at the terminal station cannot be collected.

The present invention is proposed to alleviate the above-mentioned conventional disadvantages.

SUMMARY OF THE INVENTION

An object of the present invention is to provide a supervisory system in a communication system comprising a link connected in tandem with unattended repeater stations and terminal stations, wherein the collection of supervisory information is performed by arranging the stations in a logical hierarchical configuration and using a double polling by master stations of slave stations, whereby the supervisory information can be collected at the different master stations and if one of the terminal stations malfunctions, a higher ranked station can properly collect the supervisory information. Another object of the present invention is to provide a supervisory system having an economical construction wherein the installation of special lines for supervision is not necessary since the collection of the supervisory information is performed by polling through the tandem link.

In the present invention, in order to accomplish the above-mentioned objects, there is provided a supervisory system in a communication system having a plurality of repeater stations, a plurality of terminal stations, and transmission lines, and the repeater stations and the terminal stations are connected in tandem through the transmission lines. In the system, each of the repeater stations and the terminal stations is provided with respective supervisory equipment, part of the supervisory equipment is used as a master station and the remaining portion of the supervisory equipment is used as a slave station. One supervisory equipment unit is provided as a master station which is used as a central master station, and the supervisory equipment is arranged in a logical hierarchical configuration. A slave station located between the master stations is polled therefrom and the slave station transmits the managing supervisory information therein to the respective master stations. The central master station polls each of the master stations, and the master station transmits the collected supervisory information to the central master station.

BRIEF DESCRIPTION OF THE DRAWINGS

FIG. 7 is a diagram representing construction of a supervisory system in a communication system according to an embodiment of the present invention;

FIG. 8A and FIG. 8B are diagrams representing network managing tables in the supervisory system in FIG. 7;

FIG. 10 is a diagram explaining basic frames in the supervisory system in FIG. 7;

DESCRIPTION OF THE PREFERRED EMBODIMENTS

Figure 1A:
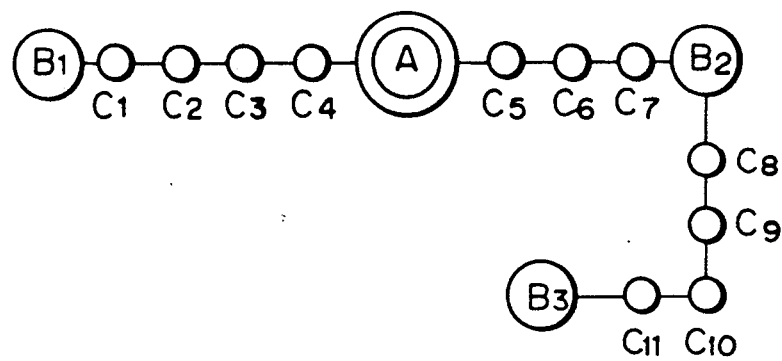
FIG. 1A is a diagram showing a communication system including terminal stations, repeater stations, and a central station to explain a principle of the present invention.
Figure 1B:
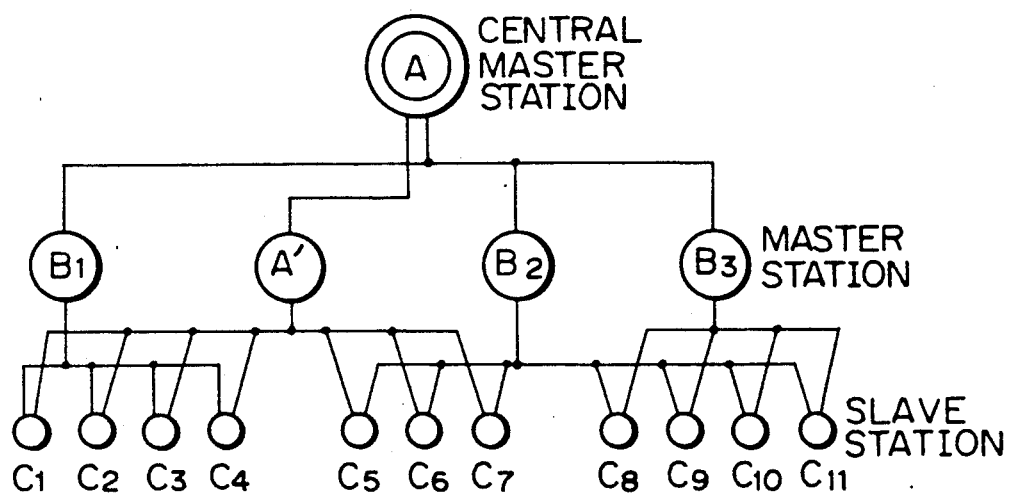
FIG. 1B is a diagram showing the system in FIG. 1A in a hierarchical configuration, to explain a principle of the present invention.

The present invention is now explained with reference to FIG. 1A and FIG. 1B.

In the Figures, assume that the repeater station or the like is represented as a slave station $C_j$ ($j=1, 2, 3, \ldots$), the station A among terminal stations represents a central master station, and the other terminal stations are represented as a master station $B_i$ ($i=1, 2, 3 \ldots$), and that these stations A, $B_i$, and $C_j$ are physically or fixedly connected in tandem and constitute a tandem link. These stations are arranged in a logical hierarchical configuration for the supervisory information, as shown in FIG. 1B. Reference mark A' shows a slave station function positioned in the same hierarchical position as the master station $B_i$ in the central master station A. The master stations A' and $B_i$ transmit an information collection command to the slave stations $C_j$ in the predetermined range by polling them through the tandem link. For example, the master station $B_1$ polls the slave stations $C_1$ to $C_4$, the master station A' polls the slave stations $C_1$ to $C_7$, the master station $B_2$ polls the slave stations $C_5$ to $C_{11}$, and the master station $B_3$ polls the slave stations $C_8$ to $C_{11}$. Accordingly, a double polling is performed on each slave station $C_j$, and each slave station $C_j$ sends information in accordance with the information collection command. The central master station A polls the master stations $B_i$ and A', and collects the information collected at each master station.

By constructing the communication system so that the repeater stations, the terminal stations, and the like are physically connected in tandem in a logical hierarchical structure, and by double polling the slave stations, if one of the master stations malfunctions, since another master station has collected the supervisory information or the like from the slave station, the collected information can be transmitted to a higher ranked station, and thus the remote supervisory function can be ensured. Since the polling is performed through the tandem link, a special line for collecting the information, different from the data transmission line, is not necessary.

An embodiment of the present invention will now be explained in detail with reference to the drawings.

Figure 2:
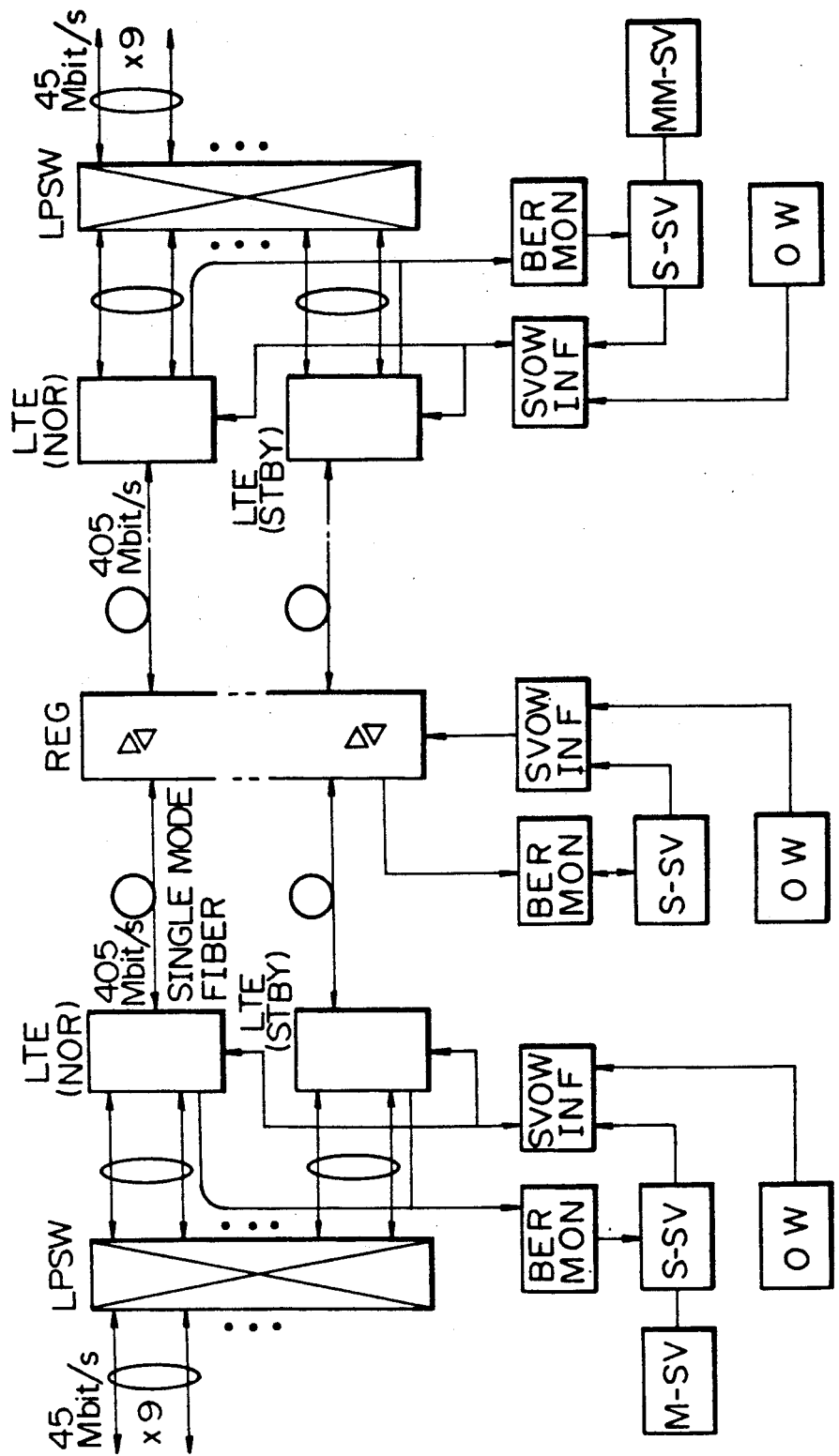
FIG. 2 is a block diagram showing a construction of a communication system to which the present invention is applied.

FIG. 2 is a block diagram showing an example of a communication system (405 Mbit/s SM (single mode) optical system) to which the present invention is applied. In the figure, LPSW denotes a line protection switch; LTE a terminal station; REG a regenerator (a repeater); BER MON a bit error rate signal monitor; SVOW INF a supervisory signal multiplexer; S-SV a slave supervisor; M-SV a master supervisor; MM-SV a central master supervisor; OW an order wire signal transmitter; LTE (NOR) terminal station for normal operation; and, LTE (STBY) a terminal station for standby operation. In FIG. 2, S-SV corresponds to $C_1$ to $C_{11}$; M-SV corresponds to $B_1$ to $B_3$; and MM-SV corresponds to A, in FIG. 1B.

Figure 3:
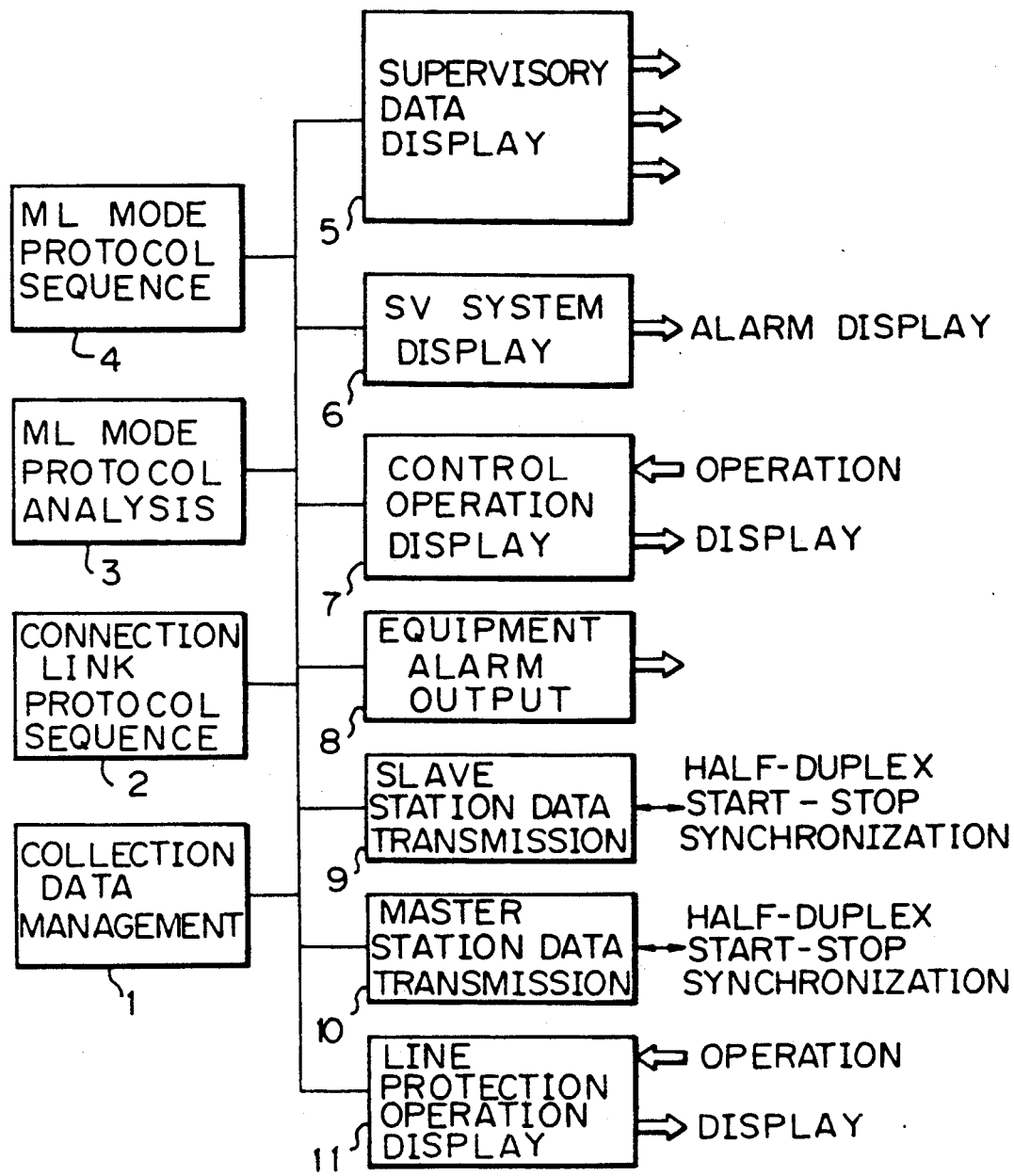
FIG. 3 is a block diagram showing a main portion of the functions of a master station in a supervisory system in a communication system according to an embodiment of the present invention.

FIG. 3 is a block diagram partially showing a master station or a central master station according to an embodiment of the present invention, and shows the supervisory function thereof. In the figure, block 1 denotes a collection data management storage and analysis function; block 2 a connection link protocol sequence function for collecting supervisory information at each station in SL (single-link) mode; block 3 an ML (multilink) mode protocol analysis function; block 4 an ML mode protocol sequence function for collecting supervisory information collected at each master station; block 5 a supervisory data display; block 6 an SV (supervisory) system display; block 7 a control operation display; block 8 an equipment alarm output; block 9 a slave station data transmission unit for transmitting commands to each slave station and receiving supervisory information from each slave station; block 10 a master station data transmission unit for transmitting commands in ML mode to each master station and receiving supervisory information from each master station; and block 11 a line protection operation display. The above-mentioned blocks 1 to 4 are constructed from a microprocessor and memories. Each of the above blocks is interconnected through a bus. The ML (multi-link) mode protocol sequence function 4 must be provided for the central master station A in FIG. 1A and FIG. 1B, but is not always necessary in the other master stations $B_1$ to $B_3$, because the central master station A connects and to collect supervisory information collected at each master station.

A transmission/reception for transmitting or receiving audio data or the like is not shown in the Figure. During this transmission/reception, an information collection command or supervisory information is multiplexed or demultiplexed, on a time sharing basis, to or from audio data as a main signal. In the SL mode, the slave station data transmission unit 9 outputs the information collection command to the slave stations and receives the supervisory information from the slave stations under the control of the connection link protocol sequence 2, and the received supervisory information is stored in the collection data management storage 1. These transmissions can be made at, for example, a half-duplex start-stop synchronization of 1200B (b/s). In the ML mode, the information collection command is output from the central master station to the master stations, and the supervisory information is received through the master station data transmission unit 10 under the control of the ML mode protocol sequence 4 and the received supervisory information is stored in the collection data management storage 1, and the information collection command of a master station is received through the master station data transmission 10 under the control of connection link protocol sequence 2 and analyzed by ML mode protocol analysis 3, and the supervisory information collected at a master station is transmitted therethrough under the control of connection link protocol sequence 2. Also, in this case, these transmissions can be made at, for example, the half-duplex start-stop synchronization of 1200B (b/s).

The master station polls the slave stations in the SL mode under the management of connection protocol sequence 2 and collects the supervisory information thereat. The central master station polls the slave stations in the SL mode under the management of connection link protocol sequence 2 and collects the supervisory information thereat, and in addition, polls the master stations in the ML mode under the management of ML mode protocol sequence 2 and collects the supervisory information from the slave stations collected by each master station.

The collection data management storage function 1 has, for example, a capacity for storing the supervisory information from 63 stations collected through the slave station data transmission unit 9 and analyzes the stored supervisory information. The master station outputs the collected data through the master station data transmission 10 in accordance with the polling from the central master station.

The supervisory data display 5 displays housekeeping information including the room temperature, open or closed state of doors or the like in each slave station, and supervisory data regarding the state of regenerators, a transmission error, detection data, and the like. The SV system display 6 displays the occurrence of a failure in a supervisory system as the result of analyzing the supervisory information by the collection data management analysis function 1. The control operation display 7 receives operation commands for housekeeping at the input thereof, and the results of the subsequent control are displayed. The equipment alarm output 8 generates an alarm when a failure of the regenerator of the slave station occurs. The line protection operation display 11 sends an operation command for the line protection switch LPSW, such as switching between normal and standby lines, and displays the same.

The ML mode protocol analysis 3 analyzes the ML mode protocol execution command and sends a command for storage of the received data to the collection data management function 1, and for the transmission of the data to be stored.

Figure 4:
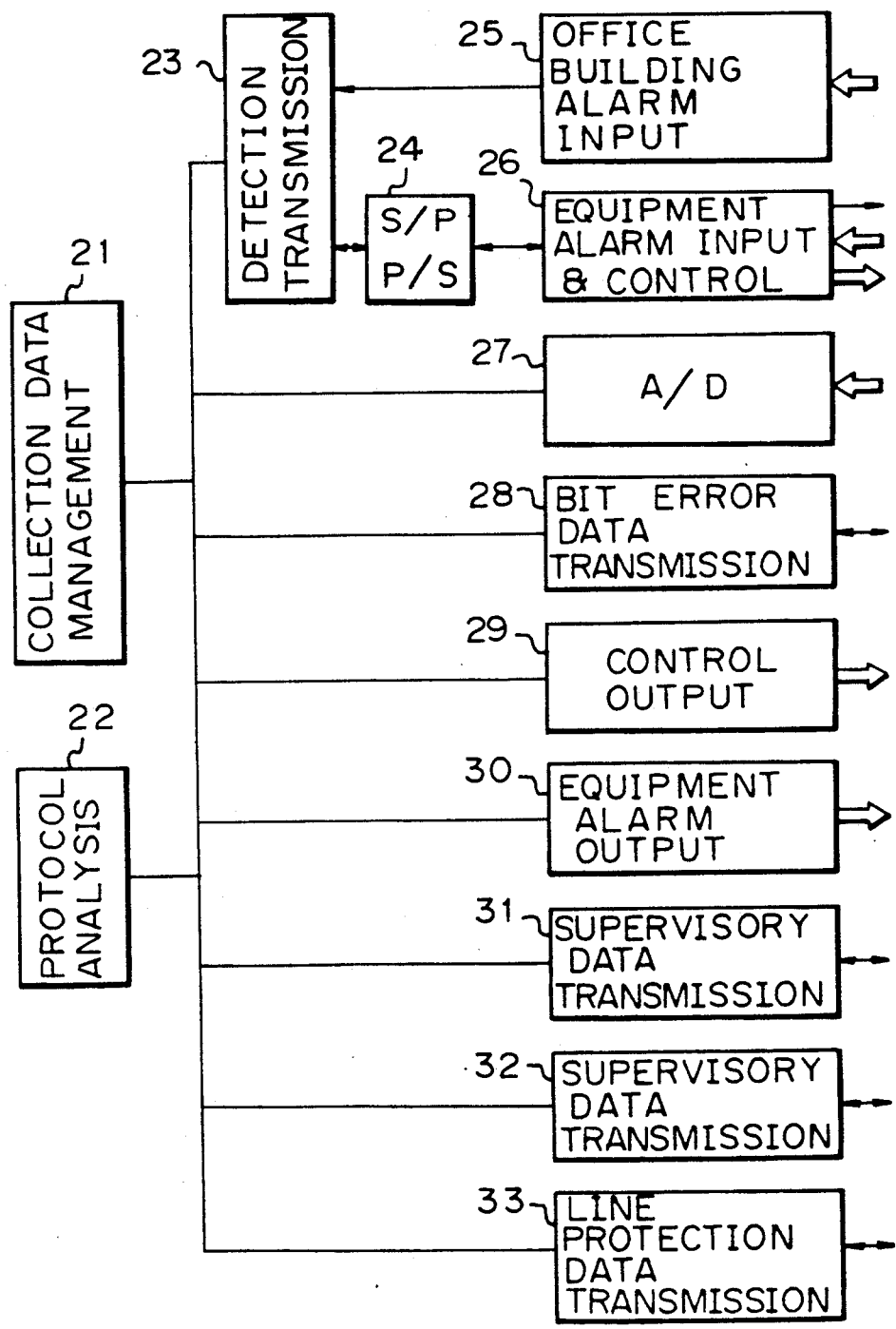
FIG. 4 is a block diagram showing a main portion of the functions of a slave station in a supervisory system in a communication system according to an embodiment of the present invention.

FIG. 4 is a block diagram showing part of a slave station in the embodiment of the present invention, and shows the supervisory functions thereof. In the figure, block 21 denotes a collection data management storage function storing various supervisory data; block 22 a protocol analysis function which analyzes information collection commands or the like from the master station and controls the transmission of the collected data. Block 23 denotes a detection transmission unit which, for example, samples input data at intervals of 100 ms, distinguishes whether or not the data is continuously identical, and outputs data indicating the same when the data is continuously identical. The detection transmission unit 23 also transmits a short-term information indicating no change in state as represented by the input data in comparison with a prior state, when being informed of receiving the information collection command by protocol analysis 22. Block 24 denotes a series-parallel and parallel-series conversion (S/P, P/S).

Block 25 represents an office building alarm input for receiving information regarding temperature and alarm information in the office building from each office building facility, e.g., open or closed doors. Block 26 represents an equipment alarm input and control unit which sequentially reads contact information at the equipment and sends control information by which ON or OFF control or the like, of switches at each portion is performed. Block 27 represents an A/D conversion unit converting an analog detection signal to a digital signal and including a current driving a laser converting an electrical function to an optical function (when the driving current becomes more than a predetermined value, a deterioration of the laser is determined), and converting another analog detection signal such as a load current for distinguishing overload or the like at an amplifier of a regenerator. Block 28 is a bit error data transmission unit performing a transmission control of the bit error data, which is a bit error rate detected from line data. Block 29 is a control output unit sending control signals to carry out a control of temperature conditions in the office building and to forcibly close doors.

Block 30 is an equipment alarm output supplying alarm signals from various portions of the equipment. Blocks 31 and 32 are supervisory data transmission functions sending supervisory data from the collection data management block 21 to the slave stations or the master stations located in one and another direction, respectively, for example, at a speed of 1200B by half-duplex start-stop synchronization, or receiving an information collection command. Block 33 is a line protection data transmission function.

The information collection command from the master station is analyzed by the protocol analysis function 22, and the data stored in the collection data management storage function 21 is output from one of the supervisory data transmissions functions 31 and 32, which send the data in the direction from which the information collection command is received.

The above-mentioned collection data management function 21 and protocol analysis function 22 comprise a microprocessor and memories, and these blocks are interconnected through a bus.

Figure 5A:
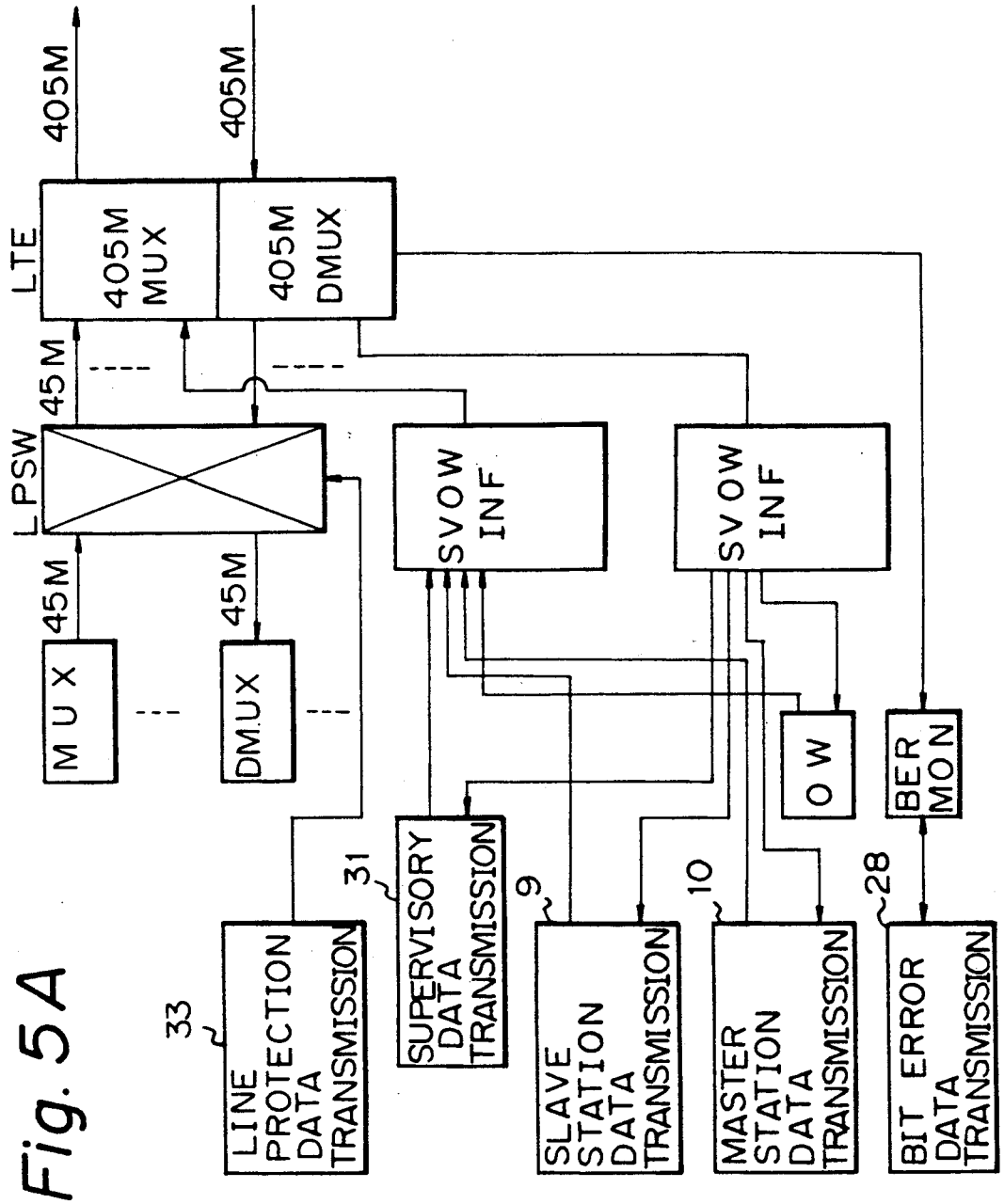
FIG. 5A, FIG. 5B and FIG. 5C are block circuit diagrams showing a connection relationship between the functions in FIG. 3 and FIG. 4 and the communication system in FIG. 2.
Figure 5B:
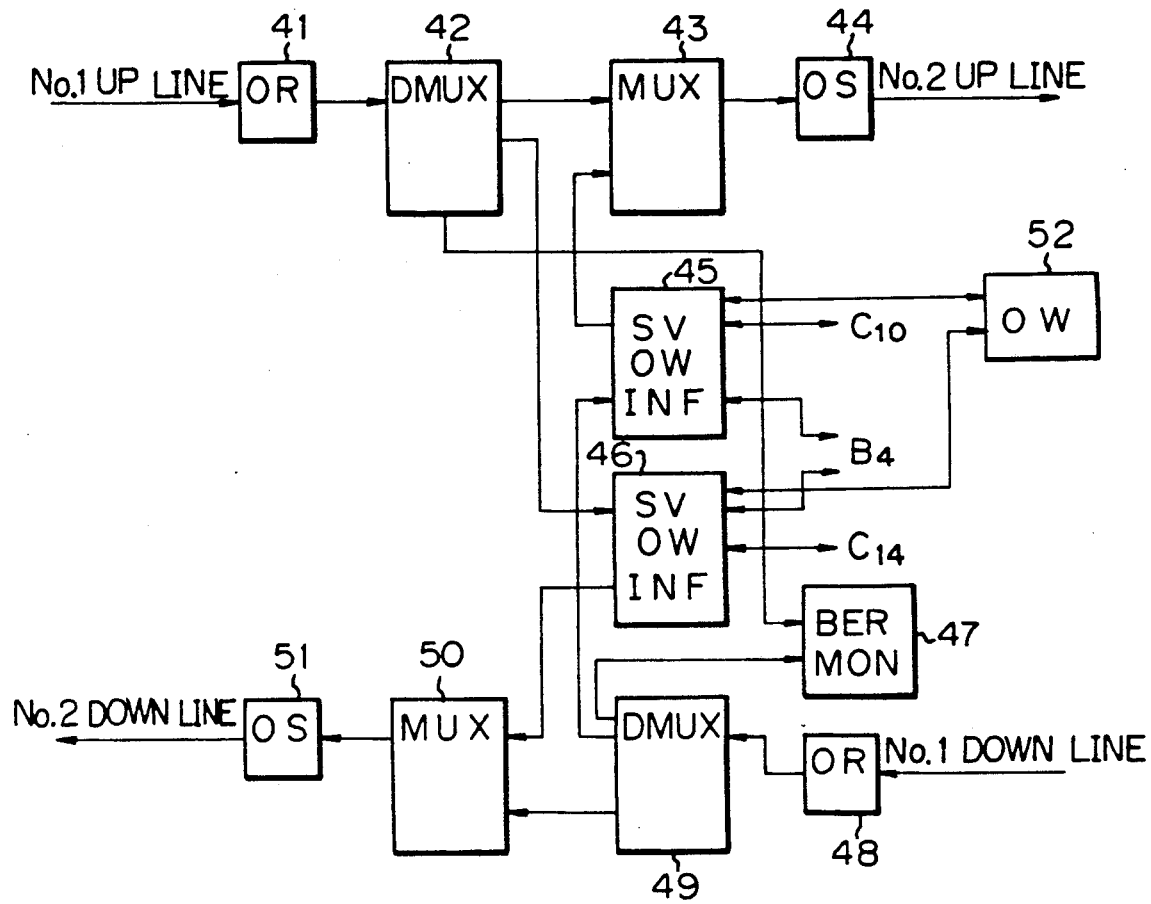
Figure 5C:
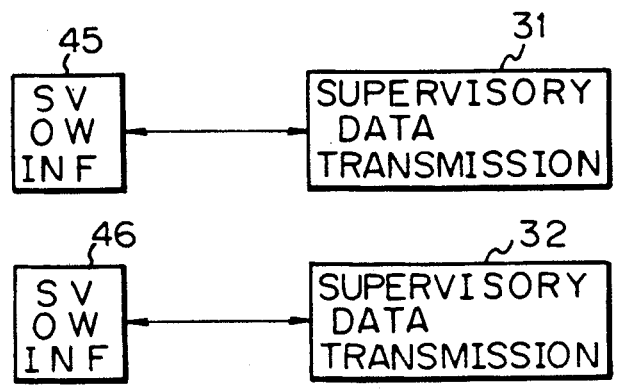

In FIG. 5A, FIG. 5B, and FIG. 5C, the connection relationship between the system in FIG. 2 and the slave station in FIG. 4 or the master station in FIG. 3 is shown. FIG. 5A shows the connection relationship between the terminal station and in FIG. 2 and a slave station, a master station. In a regenerator (REG), the slave station and master station are connected to the regenerator having at least one drop insertion function in n lines (this function is almost the same as that of the terminal station). FIG. 5B shows an interconnection relationship between the system in FIG. 2 and the master station. FIG. 5C shows the case for only the slave stations.

In FIG. 5A, the supervisory signal multiplexer (SVOW INF) multiplexes supervisory information through supervisory data transmission unit 31 of the slave station and slave station data transmission unit 9, master station data transmission 10 of a master station and polling command through slave station data transmission unit 9 in SL mode and an order wire signal from order wire transmitter OW. The SVOW INF outputs a signal to an MUX (multiplexer). At the MUX signals from SVOW INF are multiplexed with main data, such as a voice signal, based on the time division mode and inserted in an SV channel and an OW channel in the transmission frame, and are transmitted on a data transmission line with the main data so that a special line for collecting supervisory information is not necessary. Conversely, the SV channel and the OW channel are demultiplexed by a DMUX (demultiplexer) and the signals are sent to the SV equipment 31 through the SVOW INF. Bit error rate monitor BERMON monitors the rate of error produced on the data transmission line at the DMUX by parity check, and bit error data transmission 28 of a slave station collects bit error rate information of BERMON. Line protection data transmission unit 33 of a slave station at a terminal station transmits a command to LPSW for switching normal line (NOR) to stand by line (STBY), or vice versa, under the control of collection data management. In this figure, S-SV corresponds to $C_1$, $C_5$, $C_6$, $C_8$, $C_{11}$, $C_{13}$, $C_{16}$ and M-SV corresponds to $B_1$, $B_2$, $B_5$ in FIG. 7 and FIG. 9.

Figure 9:
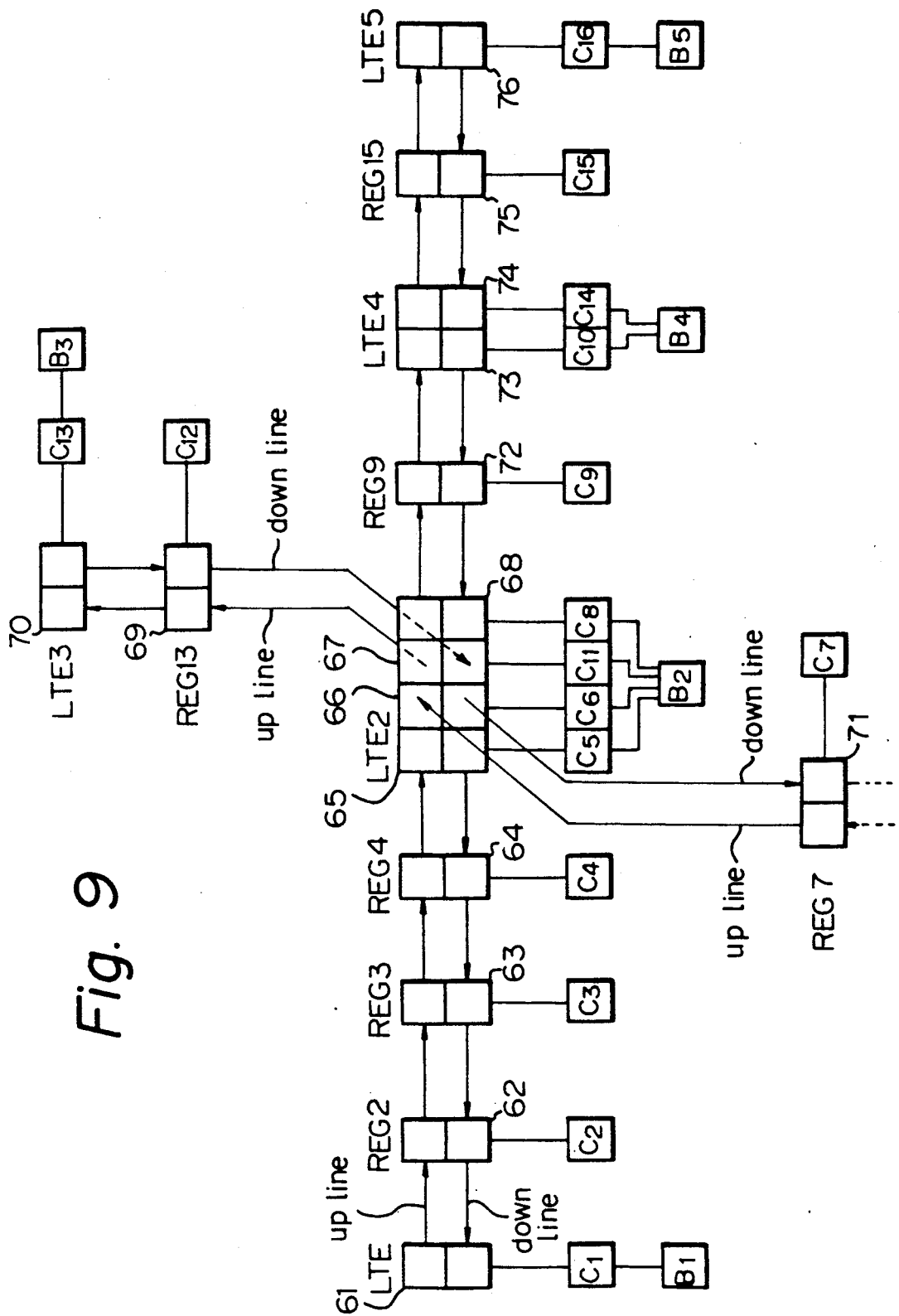
FIG. 9 is a block circuit diagram showing details of the supervisory system in FIG. 7.

FIG. 5B shows a repeater station arranged as an S-SV and M-SV corresponding to $C_{10}$, $C_{14}$, $B_4$ in FIG. 7 and FIG. 9. As mentioned above, a drop insertion function is performed by DMUX and MUX. S-SV ($C_{14}$) receives polling commands from No. 1 up line via OR 41, DMUX 42, SVOW INF 46 and its supervisory data transmission 31 (not shown) and transmits supervisory information to No. 2 down line via its supervisory data transmission 31, SVOW INF 46, MUX 50 and OS 51. S-SV($C_{10}$) receives polling commands from No. 1 down line via OR 48, DMUX 49, SVOW INF 45 and its supervisory data transmission unit 31 (not shown) and transmits supervisory information to No. 2 up line via its supervisory data transmission 31, SVOW INF 45, MUX 43 and OS 44. M-SV($B_4$) transmits polling command to No. 2 down line via its slave station data transmission unit 10 (not shown), SVOW INF 46, MUX 50, OS 51, and receives supervisory information from No. 1 up line via OR 41, DMUX 42, SVOW INF 46 and its slave station data transmission unit 10. And M-SV($B_4$) also transmits polling commands to NO. 2 up line and receives supervisory information from No. 1 down line via its slave station data transmission unit 10 and SVOW INF 45. And as the same with FIG. 5A, BERMON 47 monitors error rates of the up line and down line, and up line's error rate is transmitted to bit error data transmission unit 28 of S-SV ($C_{14}$) and down line's error rate is transmitted to bit error data transmission unit 28 of S-SV ($C_{10}$). Order wire transmitter 52 is connected to both SVOW INF 45 and 46. When a repeater station is not arranged as an M-SV and operates as a slave station, the repeater has only one slave station corresponding to $C_2$, $C_3$, $C_4$, $C_3$, $C_9$, $C_{15}$, $C_{13}$ in FIG. 7 and FIG. 9. So as shown in FIG. 5C supervisory data transmission 31 connects to SVOW INF 45 and supervisory data transmission 32 connects to SVOW INF 46. In the figure, OR is an optical receiver and OS is an optical sender.

The polling from the M-SV through the No. 1 down line is sent to the M-SV through the No. 2 up line. The polling from the M-SV through the No. 1 up line is sent to the M-SV through the No. 2 down line. Therefore, the M-SV's at both sides can poll a synchronously without signal collision. The M-SV's at both sides have two proper channels.

Figure 6:
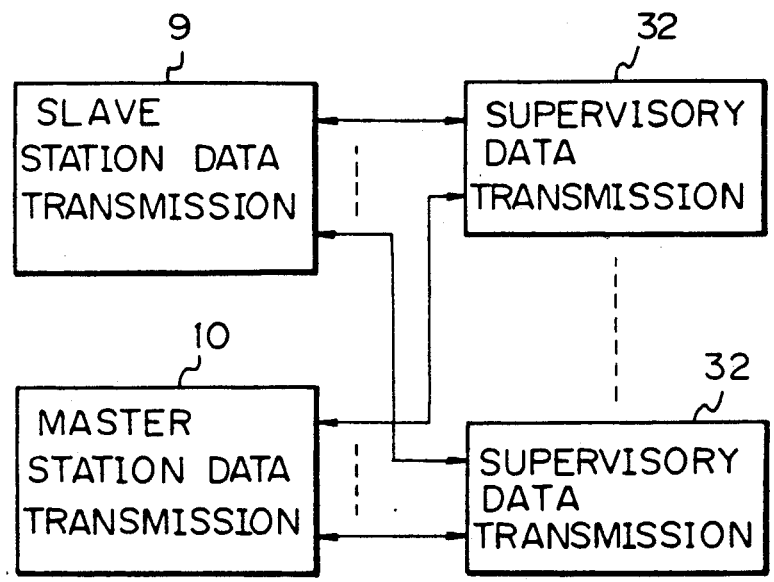
FIG. 6 is a block diagram showing a connection relationship between the functions in FIG. 3 and FIG. 4.

FIG. 6 shows a relationship between the connection of the S-SV and the M-SV at the same station. Both slave station data transmission unit 9 and master station data transmission unit 10 have six connection portions to S-SV. And in the SL mode, the data is transmitted and received between slave station data transmission unit 9 of a M-SV and supervisory data transmission unit 32 of each S-SV's. And in the ML mode, the data is transmitted and received between master station data transmission unit 9 of M-SV and the same. Since M-SV has six connections to S-SV, a maximum of six S-SV's can be applied to the M-SV.

FIG. 7 is a diagram explaining the construction of a supervisory system, wherein $B_1$ to $B_5$ are master stations such as terminal stations, and are provided with the supervisory functions shown in FIG. 3. One of the terminal stations functions as the central master station. $C_1$ to $C_{16}$ are slave stations, and are provided with the supervisory functions shown in FIG. 4. The master stations $B_1$ to $B_5$ are provided with slave stations corresponding to connection portions to each transmission branch. That is, the master station $B_1$ is accompanied by $C_1$, the master station $B_2$ by $C_5$, $C_6$, $C_8$, and $C_{11}$, the master station $B_3$ by $C_{13}$, the master station $B_4$ by $C_{10}$ and $C_{14}$, and the master station $B_5$ by $C_{16}$. To expand the number of branches, a maximum of six slave stations can accompany a master station. Hereinafter, each of the master stations $B_1$ to $B_5$ has the same function as the master supervisory function, and each of the slave stations $C_1$ to $C_{16}$ has the same function as the slave supervisory function.

In this description, between one master station and another located next thereto, for example between $B_1$ and $B_2$, between $B_2$ and $B_4$, . . . is called a link. So a single link mode means that a master station collects supervisory information at slave stations directly within a link connected thereto. And a multilink mode means that supervisory information at a master station must pass through a plurality of links in order that information a central station collects that.

The master supervisory function also polls the accompanied slave supervisory function corresponding to the non-installed transmission line. Thus, since the response to the polling is obtained from the slave supervisory function for which the transmission line is installed, when an installation expansion is required, connection is easily possible. The slave station sends the supervisory information upon receiving a double polling by different master stations. The slave supervisory function appended to the master stations $B_1$ to $B_5$ sets a first equipment number and the equipment number of the slave supervisory function at a link end. For example, the slave supervisory function $C_5$ appended to the master station $B_2$ is set to be able to recognize the slave supervisory function $C_1$ at the link end and is set to recognize the presence of the slave supervisory functions $C_2$, $C_3$, and $C_4$ in the middle of the link. These settings can be carried out by using a predetermined area in a network management table.

FIG. 8A and FIG. 8B are diagrams explaining the network management table. The protocol analysis of the master station is provided with an ML mode transference direction network management table shown in FIG. 8A. The table has an area in which the number of links from the central master station MM-SV (the central master station in the master stations $B_1$ to $B_5$ or the central master station not shown in the figure) to the master stations M-SV ($B_1$ to $B_4$) or the slave stations S-SV ($C_1$ to $C_{16}$) is set or stored, and another area at which the direction (01H to 06H) (in the case of a maximum 6 directions) to which the ML mode protocol is transferred is set. The initial settings are all non-installed (00H).

The direction from which an SIR (setting information transference request) protocol for a noninstalled master station M-SV or an SIT (line status information transference) protocol is received, is set in this network management table. At the central master station MM-SV, the direction from which the SIT protocol for the output SIR protocol is received and the number of links LCN are set.

At the central master station MM-SV, the network management table setting S-SV is provided as shown in FIG. 8B. In the table, the master station M-SV equipment numbers (01H to 0FH) by which a maximum 63 slave stations are managed are set or stored. As an initial setting, after an all non-installed setting (00H), the SIR (setting information transference request) protocol is carried out for the installed M-SV and S-SV, and the contents of the execution response are set. Where the different master stations M-SV's are doubled up to one slave station S-SV, the master station M-SV having a lesser number of links is set. Therefore, the central master station polls the master station having the lesser number of links, and thus can collect information with a high efficiency.

Where the setting changes in a first link, such as an expansion, in the master station M-SV, which manages the slave station S-SV, "1" is set in the protocol request information I of the MLRD basic frame (see FIG. 10) and is output. Upon receiving the request information I, the central master station MM-SV carries out the above-mentioned setting information transference request SIR protocol and changes the setting contents. Accordingly, the setting changes in the link, such as expansion, removal, and changes of connections, are easily performed. The data transmission in the ML mode is performed by using the network management tables in FIG. 8A and FIG. 8B.

In FIG. 7, assuming that the master station $B_4$ is the central master station, when the information at the master station $B_2$ is collected, the information collection command is output through the master station data transmission unit 10 by control from the ML mode protocol sequence 4 (see FIG. 3). Where, as an inner-link receiving S-SV equipment number ADR of the inner-link basic frame (see FIG. 10), the equipment number of the slave supervisory function $C_8$, which is a link end in the direction toward the master station $B_2$, is set as a receiving M-SV equipment number RMA of the MLCD basic frame, the $B_2$ is set as a sending M-SV equipment number SMA, the $B_4$ is set, and the execution command is set on the ML mode transference data MDAT1 and is output.

At the slave supervisory function $C_8$, since the inner-link receiving S-SV equipment number ADR is $C_8$, the information collection command is self forwarding, and since the receiving M-SV equipment number RMA is $B_2$, the information collection command is forwarded to the master supervisory function $B_2$. As mentioned above, since the master supervisory function $B_2$ polls the slave supervisory functions $C_5$, $C_6$, $C_8$, and $C_{11}$, when the slave supervisory function $C_8$ is polled, the prior-received MLCD basic frame is transferred. Whereby, the master supervisory function $B_2$ analyzes the execution command in the ML mode protocol analysis function 3 (see FIG. 3), and the data stored in the collection data management storage 1 is output through the master station data transmission unit 10. In this case, the inner-link receiving S-SV equipment number ADR of the inner-link basic frame is set as $C_{10}$. The receiving M-SV equipment number is output as $B_4$, and the sending M-SV equipment number is output as $B_2$, through the slave supervisory function $C_8$ receiving the information collection command. That is, the execution response is output to the slave supervisory function, which is in the direction from which the execution command is received.

Accordingly, the central master station $B_4$ can collect the supervisory information collected at the master station $B_2$ by polling. Moreover, the master station and the central master station can collect the supervisory information by a comparatively simple operation, since each station performs the data collection process by polling at a predetermined period.

Similar to the above, the central master station $B_4$ can collect the information collected at the master station $B_1$ by polling. In this case, the inner-link receiving S-SV equipment number ADR is $C_1$, the receiving M-SV equipment number RMA is $B_1$, and the sending M-SV equipment number SMA is $B_4$. In the master station $B_2$ in the middle thereof, the information collection command is output to all of the slave supervisory functions appended to the first station without distinguishing the direction of the relaying transference of the information collection command. In the slave supervisory functions $C_5$, $C_6$, $C_8$, and $C_{11}$, only the slave supervisory function $C_5$, having the designated S-SV equipment number $C_1$ in the first link by the inner-link receiving S-SV equipment number ADR, outputs. Thus, at the master station $B_2$, the direction from which the information collection command is received, is stored as the slave supervisory function $C_8$, and when the execution response from the master station $B_1$ is received, the execution response is transferred to the slave supervisory function $C_8$, and then is sent in the direction of the central master station $B_4$.

As the information collection command, various commands can be prepared, and accordingly, the supervisory information at the slave stations and the master stations which constitute the tandem link can be securely and easily collected.

FIG. 9 shows a real system corresponding to that of FIG. 7. Each rectangular box 61, 62, 63, . . . 75, 76 shows portions connecting up line and down line. Rectangular boxes 61; 65, 66, 67 and 68; 70; 73 and 74; and 76 connect respectively to LTE 1, 2, 3, 4, 5 which are one-side connecting portions. Rectangular boxes 62, 63, 64, 69, 71, 72, and 75 connect respectively to REG 2, 3, 4, 13, 7, 9, and 15, which are two-side connecting portions. And slave station connects to each rectangular box.

FIG. 10 is a diagram explaining basic frames. An inner-link basic frame in ML mode comprises a start of text STX function, an inner-link receiving S-SV (slave supervisory function) equipment number ADR, an execution command receiving S-SV or an execution response sending S-SV number MLC(multi-link-command)/MLR(multi-link-response), a multi-link data MLCD(multi-link-command-data)/MLRD(multi-link-response-data) area, an end of text indicator, and a block check character BCC.

An MLCD basic frame comprises a receiving M-SV (master supervisory function) equipment number RMA, a sending M-SV equipment number SMA, a link counter LCN, and ML (multi-link) mode transference data MDAT1. The receiving and sending M-SV equipment numbers comprise 7 bits, wherein four bits 01H to 0FH in the 7 bits designate the equipment number. The link counter LCN transmits the contents after adding 1, when a receiving M-SV equipment number RMA of a receiving MLC protocol does not designate the equipment itself. In addition, the link counter is set as 1 when the central master station outputs the contents of the link counter.

An MLRD basic frame comprises a receiving M-SV equipment number RMA, a sending M-SV equipment number SMA, a link counter LCN, a protocol request information area I, and an ML mode transference data portion MDAT1. The link counter LCN transmits the receiving content of the MLC protocol link counter without change. The S-SV denotes the supervisory functions of the slave station, the M-SV denotes the supervisory functions of the master station, and the MM-SV denotes the supervisory function of the further higher rank station, i.e., the central master station.

Figure 11:
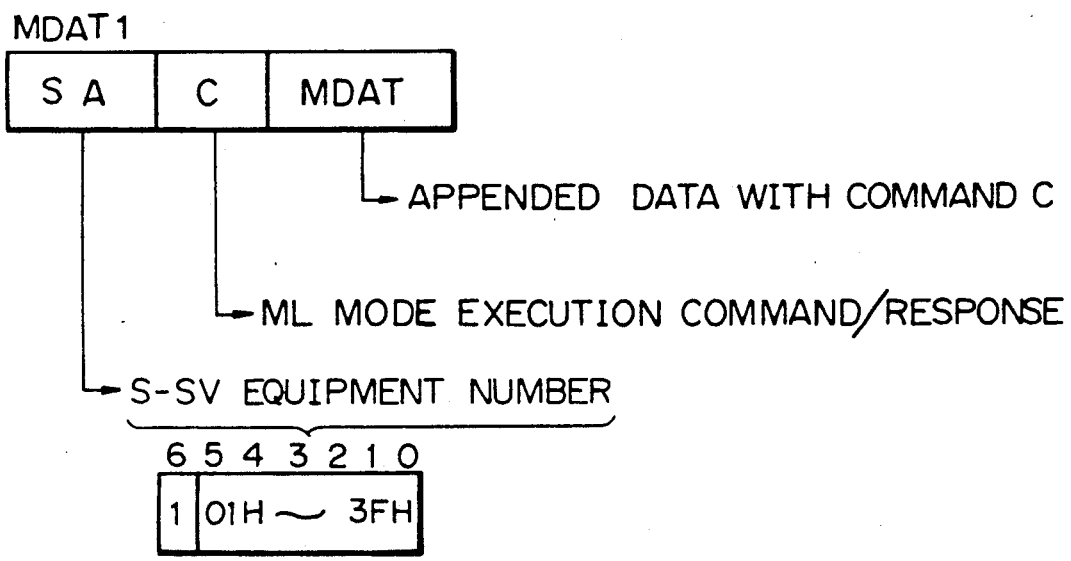
FIG. 11 is a diagram explaining an MDAT1 frame in the supervisory system in FIG. 7; and, FIG. 12 is a diagram explaining a sequence of the transmission of the supervisory information in the supervisory system in FIG. 7.

FIG. 11 is a diagram explaining the frame portion of the MDAT1, which comprises an S-SV equipment number SA, an ML mode execution command/response C, and accompanying data MDAT of the command C. The S-SV equipment number comprises 7 bits and is designated by 5 bits 01H to 3FH.

The above mentioned inner-link basic frame is for the ML made. In SL mode for collecting supervisory information at each slave station, MLCD and MLRD basic frames are replaced with SL mode transference data SDAT1 which comprises an S-SV equipment number SA, an SL mode execution command/response C, and accompanying data SDAT of the command C. The S-SV equipment number comprises 7 bits and is designated by 5 bits 01H to 3FH.

Figure 12:
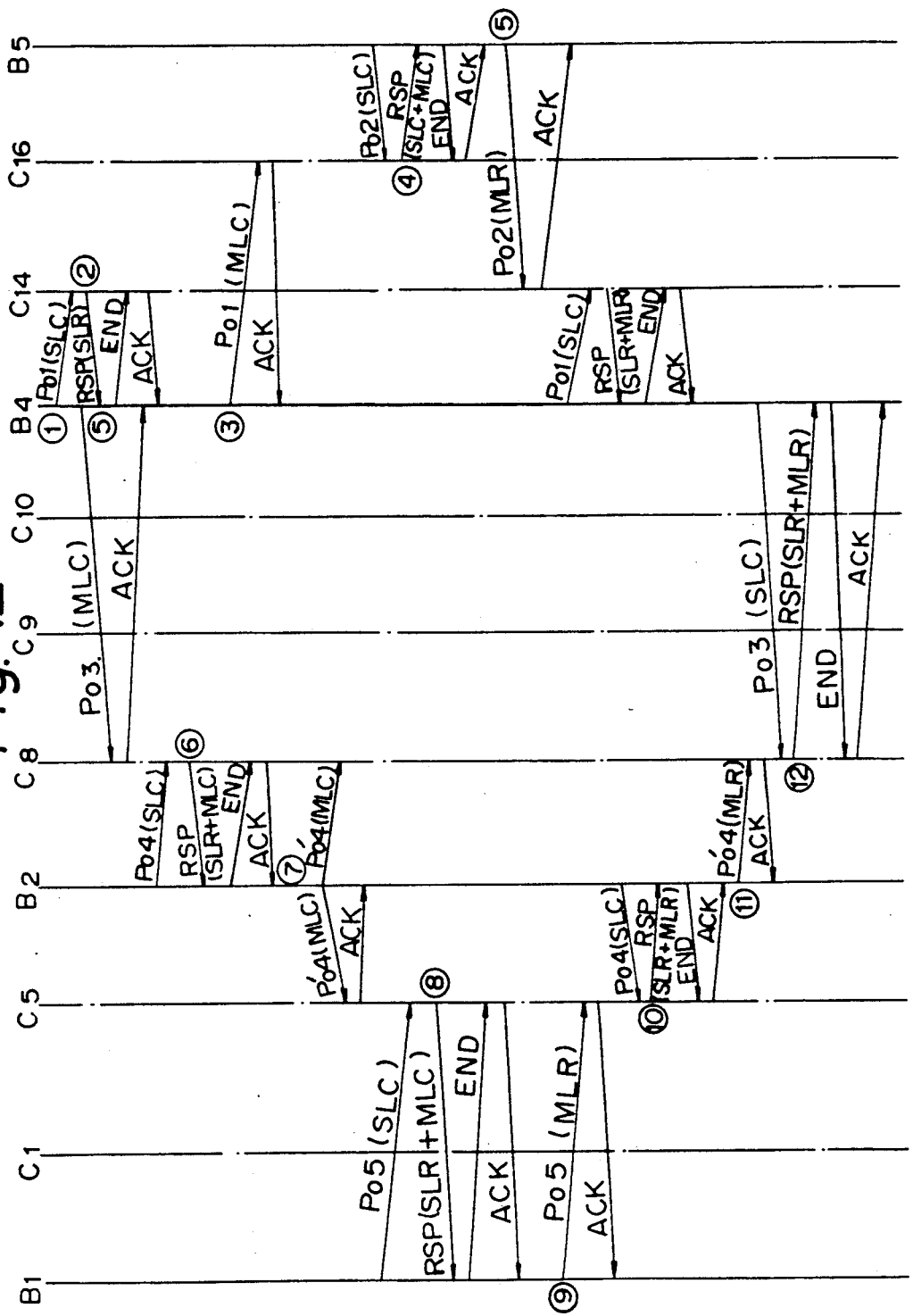

FIG. 12 is a diagram explaining a sequence of the transmission of the supervisory information in the supervisory system in FIG. 7 and FIG. 9.

With reference to FIG. 10, FIG. 11, and FIG. 2, the sequences of the ML mode and SL mode in the arrangement of FIG. 7 and FIG. 9 are explained.

(1) Pol (Single-Link-Command)

Pol (SLC) is a polling to the S-SV ($C_{14}$) in the single link (SL) mode by the MM-SV ($B_4$). In this case, the transmission frame is the inner-link basic frame in FIG. 10, and the MLC/MLR and the MLCD/MLRD portions are replaced by SDAT1, which is similar to the MDAT1. The SDAT1 consists of SA, C, and SDAT. The ADR portion is set by the S-SV having the equipment number $C_{14}$.

(2) RSP (Single-Link-Response)

RSP (SLR) is a response signal by $C_{14}$. The changing information detected at the detection transmission 23 in FIG. 4 is output. The transmission frame is the same as the Pol (SLC) but ADR is set by the M-SV having the equipment number $B_4$ and the SA is $C_{14}$.

(3) Pol (MLC)

Pol (MLC) is a polling in the multi-link mode of MM-SV (information collection from $B_5$). The transmission frame is the MLCD basic frame plus the STX, ADR and MLC at the top thereof. ADR is $C_{16}$, MLC is $C_{16}$, RMA is $B_5$, SMA is $B_4$, and LCN is 1. MDAT1 consists of SA, C, and MDAT.

(4) RSP (SLC+MLC)

The transmission frame consists of STX, ADR, SA, C, SDAT, MLC, RMA, SMA, LCN, SA, C, MDAT, ETX, and BCC. ADR is $C_{16}$, MLC is $C_{16}$, RMA is $B_5$, SMA is $B_4$, and LCN is 1. The $C_{16}$ transmits the collection data of the equipment (SDAT1) by polling from $B_5$ and the ML mode frame from $B_4$.

(5) Where $B_4$ collects the information at $B_1$ through $B_2$

The frame consists of STX, ADR, MLC, RMA, SMA, LCN, MDAT1, EXT, and BCC. ADR is $C_1$, MLC is $C_8$, RMA is $B_1$, SMA is $B_4$, and LCN is 1. At first, the information is sent to $C_8$.

(6) RSP (SLR+MLC)

By polling from $B_2$, $C_8$ transmits SLR+MLR in the same way as in item (4).

(7) The supervisory data transmission unit 32 transmits the MLC to all of the dependent slave stations $C_5$, $C_8$, $C_6$, and $C_{11}$, when the information is not itself forwarded. LCN is increased by 1. Where there is no relationship of the information, there is no processing, and thus the efficiency of polling increases and the load is decreased. $C_5$ recognizes the presence of $C_1$ (MLC) in its own link (slave station at the opposite end), and accordingly, ACK is sent back. $B_2$ only memorizes the reception of the command from $C_8$.

(8) $C_5$ transmits SLR+MLC by polling from $B_1$.

(9) Po5 (MLR)

The frame consists of STX, ADR, MLC, RMA, SMA, LCN, and others. ADR is $C_8$, MLC is $C_5$, RMA is $B_4$, SMA is $B_1$, and LCN is 2.

(10) (11) (12)

By polling from $B_2$, $B_2$ collects SLR+MLR from $C_5$. MLR is transferred immediately to $C_8$. $C_8$ transmits SLR+MLR by polling from $B_4$, and $B_4$ collects the data at $B_1$. $B_4$ has recognized the relationship between $B_1$ and LCN by the network management table, and thus, by comparing it with the receiving MLR frame, $B_4$ confirms normal reception.

As above mentioned, the M-SV devotes itself to a first polling and the S-SV only controls the response for polling, and thus, the polling efficiency is increased.

I claim:

1. A supervisory system in a communication system, comprising:

first and second repeater stations, first, second and third terminal stations, and transmission lines, the repeater stations and the terminal stations being fixedly connected in tandem through the transmission lines;

each of the first and second repeater stations and the first, second and third terminal stations including transmission line supervisory equipment, each repeater station including a slave station, the first and second terminal stations including master stations and the third terminal station including a central master station, the first and second terminal stations each including a slave station;

each slave station being located between at least two master stations and being polled therefrom and transmitting supervisory information to both of the at least two master stations;

said central master station polling each of said master stations, and each master station collecting and transmitting the supervisory information to said central master station;

each of the master stations and the central master station having connected thereto a slave station which is connected to one of the first and second repeater stations; and the master stations and the central master station polling said slave stations and collecting said supervisory information.

2. A supervisory system as set forth in claim 1, wherein the central master station includes a single link mode in which each master station polls respective slave stations and collects the supervisory information from respective slave stations, and multilink mode in which the central master station polls each master station and collects the supervisory information from each master station.

3. A supervisory system as set forth in claim 2, wherein in the multi-link mode, the central master station polls the slave station of an adjacent master station, and the slave stations transmit the supervisory information to the adjacent master station upon polling by said central master station.

4. A supervisory system as set forth in claim 3, wherein one of the master stations, upon being polled in the multi-link mode, transmits the supervisory information to one of the slave stations adjacent the central master station, and the one of the slave stations transmits the supervisory information from the one of the master stations upon being polled by the central master station.

5. A supervisory system as set forth in claim 3, wherein a first of the master stations, upon polling a second of the master stations in the multi-link mode, outputs information, concerning the polling in the multi-link mode by the central master station, to the slave stations, and the first of the master stations repeats the polling in the multi-link mode.

6. A supervisory system, comprising:
- a first slave station collecting and transmitting first slave supervisory information;
- at least first and second master stations fixedly connected to said first slave station, each of said first and second master stations collecting the first slave supervisory information from said first slave station by polling; and
- a single central master station fixedly connected to said first and second master stations and collecting the slave supervisory information and master supervisory information from said first and second master stations.

7. A supervisory system as set forth in claim 6, further comprising a second slave station producing second slave supervisory information, connected to said second master station and said central master station, said central master station and said second master station collecting the second slave supervisory information from said second slave station by polling.

8. A supervisory system in a communication system, comprising:
- a first group of repeater stations connected in series each repeater station producing respective repeater supervisory information and having first and second ends;
- a second group of repeater stations connected in series, each repeater station producing repsective repeater supervisory information and having first and second ends;
- a first terminal station connected to said first group of repeater stations at the first end thereof, capable of communicating with said first group of repeater stations to produce first group supervisory and terminal information;
- a second terminal station connected to said first group of repeater stations at the second end thereof, connected to said second group of repeater stations at the first end thereof, capable of communicating with said first group of repeater stations to produce the first group supervisory and terminal information and capable of communicating with said second group of repeater stations to produce second group supervisory and terminal information; and
- a third terminal station connected to said second group of repeater stations at the second end thereof, capable of communicating with said second group of repeater stations to produce the second group supervisory and terminal information, producing system supervisory information from the first and second group supervisory and terminal information.

9. A system as recited in claim 8, wherein said first group of repeater stations includes first and second end repeater stations connected to said first and second end terminal stations, respectively, said second group of repeater stations includes first and second end terminal stations connected to said second and third terminal stations, respectively, said third terminal station collecting the first group supervisory and terminal information from said first terminal station by sending a multilink command to the second group first end repeater station, said second group first end repeater station providing the multilink command to said second repeater station in response to a single link command from said second terminal station, said second terminal station sending the multilink command to the first group first end repeater station, the first group first end repeater station providing the multilink command to said first terminal station in response to the single link command from said first terminal station, said first terminal station sending the first group supervisory and terminal information to said first group second end repeater station, said first group second end repeater station providing the first group supervisory and terminal information to said second terminal in response to the single link command from said second terminal, said second terminal sending the first group supervisory and terminal information to the second group second and repeater station, the second group second end repeater station providing the first group supervisory and terminal information to said third terminal station in response to the single link command from said third terminal station.

10. A system as recited in claim 9, wherein the communication system comprises a time division multiplex system, the multilink command having a supervisory time slot and the single link command having a single link time slot different from the supervisory time slot.

11. A system as recited in claim 10, wherein said first through third terminal stations obtain the repeater supervisory information by polling in the single link time slot and said third terminal station obtains the first and second group supervisory and terminal information by polling in the multilink time slot.

12. A system as recited in claim 9, wherein said first group of repeater stations, said first terminal station and said second terminal station are connected via a tandem optical communication link allowing single link polling in two directions simultaneously, and allowing said first terminal station to poll the first group second end repeater station at the same time said second terminal station polls said first group first end repeater station.

13. A system as recited in claim 12, wherein said third terminal station obtains the first group supervisory and terminal information from said first terminal station when said second terminal station is malfunctioning.

14. A system as recited in claim 9, further comprising:
- a third group of repeater stations connected in series each repeater station producing repeater supervisory information and having first and second ends, the first end connected to said second terminal station; and
- a fourth terminal station connected to said third group of repeater stations at the second end thereof, capable of communicating with said first group of repeater stations to produce third group supervisory and terminal information, said third terminal station producing the system supervisory information from the first through third group supervisory and terminal information.

15. A system as recited in claim 14, wherein said multilink command has a terminal station address, said third group of repeater stations includes first and second end repeater stations connected respectively to said second and fourth terminal stations, and said second terminal station sending the multilink command to the third group second end repeater station, said third group second end repeater station providing the multilink command to said fourth terminal station in response to the single link command from said fourth terminal station, said fourth terminal station providing the third group supervisory information to the third group first end repeater if said terminal station address identifies said fourth terminals.

16. A system as recited in claim 9, wherein said first group first end repeater station is in a same location as said first terminal station and said first group second end repeater station is in the same location as said second terminal station.

* * * * *

UNITED STATES PATENT AND TRADEMARK OFFICE
CERTIFICATE OF CORRECTION

PATENT NO. : 5,038,140

DATED : August 6, 1991

INVENTOR(S) : Satoshi Ikeuchi

It is certified that error appears in the above-identified patent and that said Letters Patent is hereby corrected as shown below:

```
      Title Page:
      IN THE ABSTRACT:   line 5, delete "regarding" and insert
                 --for--.
      Col. 2,    last line, after "and" delete ",".
      Col. 6,    line 27, after "station," insert --and--.
      Col. 7,    line 11, "command" s/b --commands--;
                 line 38, "a synchronously" s/b
                 --asynchronously--.
      Col. 8,    line 11, delete "informa";
                 line 12, delete "tion" and after "that"
                 insert --information--.
      Col. 11,   line 2, after "In" insert --the--.
      Col. 11,   line 2, "made" should be --mode--.
```

Signed and Sealed this

Fourth Day of May, 1993

Attest:

MICHAEL K. KIRK

*Attesting Officer*      Acting Commissioner of Patents and Trademarks